UNITED STATES PATENT OFFICE.

JONAS W. AYLSWORTH, OF EAST ORANGE, NEW JERSEY, ASSIGNOR TO CONDENSITE COMPANY OF AMERICA, OF EAST ORANGE, NEW JERSEY, A CORPORATION OF NEW JERSEY.

ELECTRICAL-INSULATION COMPOSITION AND METHOD OF PREPARING THE SAME.

1,092,511.   Specification of Letters Patent.   Patented Apr. 7, 1914.

No Drawing.   Application filed November 4, 1910.   Serial No. 590,599.

*To all whom it may concern:*

Be it known that I, JONAS W. AYLSWORTH, a citizen of the United States, and a resident of East Orange, in the county of Essex and State of New Jersey, have invented a certain new and useful Electrical-Insulation Composition and Method of Preparing the Same, of which the following is a description.

In my application entitled Plastic composition and method of preparing the same, Serial No. 590,601, filed November 4, 1910, I describe and claim an improved product comprising a powdered infusible phenolic condensation product incorporated with vulcanized india rubber or gutta percha, the condensation product particles being intimately cemented together in the rubber by a tenacious elastic bond. Thereby is produced a novel composition which is exceedingly useful in many applications in which hard or soft rubber are commonly used.

My present application relates to a composition of the same general character, and to methods for producing the same, the composition being formed in such a manner as to render it especially valuable for purposes of electrical insulation.

It comprises an initially plastic mass which will become non-plastic by heating to from 300 to 360 degrees F., this composition having special qualities which render it an efficient electrical insulator which may be used in some situations in which the well known insulators may not be successfully used. My improved insulating composition is, for example, particularly applicable for use in alkaline and acid storage and primary batteries where the insulation is exposed to damage from the electrolyte used, and where the electrolyte is exposed to contamination from the insulation. For such purposes the purest grades of hard rubber and porcelain or glass have heretofore been used, but the high cost of hard rubber and its liability to contaminate the electrolyte because of impurities, which liability is present unless this substance is specially prepared, are its objectionable features. The liability of glass and porcelain to become broken and their contaminating effects render them of limited use as insulating substances in alkaline batteries. Condensation products of phenol and formaldehyde which are now well known in the art are to a large extent resistant to acid electrolytes, and to dilute alkaline electrolytes, but they are chemically broken down in strong caustic alkaline solutions, especially when moderately heated. They also contaminate the electrolyte. I refer especially to the products formed by other inventors than myself, in which no especial provision is made for causing substantially all of the phenol and formaldehyde or other methylene-containing ingredient to enter into chemical combination, as is disclosed in my prior application Serial No. 496,060, filed May 14, 1909, Plastic composition and process of manufacturing the same, and Patent No. 1,020,593, granted March 19, 1912, Phenolic condensation product and method of preparing the same.

My improved insulating composition now to be described comprises a plastic mass made from a specially prepared powder or comminuted hard infusible chemically inert condensation product of a phenolic body and formaldehyde, or equivalent agent containing the methylene radical $CH_2$ incorporated with pure high grade rubber and sulfur in proportion to suit special requirements of flexibility and vulcanized at such a temperature that all the sulfur is chemically fixed or combined with the rubber, the mass also preferably being further purified of objectionable impurities.

The powdered or comminuted infusible condensation product which I incorporate with the rubber mass to form the insulating compound as above stated, is preferably formed as follows:—The fusible phenolic condensation product which is described in my application and patent above referred to, and also in my Patent No. 1,029,737, entitled Fusible phenol resins and method of forming same, granted June 18, 1912, and there termed "phenol resin" is prepared by combining pure phenol or homologue thereof with formaldehyde in the proportion of three molecules of phenol to two molecules of formaldehyde, the reaction being caused to take place in a special vessel under pressure. When the reaction is completed, the water formed thereby is allowed to escape, and superheated steam is passed through the mass until the distillate shows only traces of phenol or homologue thereof. The product thus obtained is further heated to drive out the last traces of water and is then run into a suitable iron or copper vessel which is provided with a steam jacket and a stirring or mixing device. The mixer should be adapted to be lifted out of the mass at the critical moment before hardening of the same takes place. The molded mass is allowed to cool to a temperature of about 230 degrees F., and 6 to 7 per cent. of dry powdered hexa-methylene-tetra-amin $(CH_2)6N_4$ is added and rapidly stirred in. In a few minutes the hexa-methylene-tetra-amin dissolves in the mass, when the stirring device is removed and the vessel covered and connected to the ammonia absorbing apparatus. Steam is then turned into the jacket of the vessel and the mass is rapidly heated to 300 degrees F., whereby the final hardening reaction between the ingredients takes place violently, and quantities of ammonia $NH_3$ are evolved, which causes the hardening mass to puff up like leavened bread into a hard porous mass which when cool may readily be broken up and pulverized. The porous mass is powdered and further heated to from 400 to 500 degrees F. for a time, which renders the product less liable to be affected by strong hot alkalis. The powdered product is then treated with boiling 10% caustic potash or soda solution for several hours and washed free of the caustic potash or soda and dried. The product is now ready for incorporation with the pure rubber and sulfur. The proportions preferred for battery insulation parts are—40 to 80 parts of the powdered phenolic condensation product and 60 to 20 parts of the rubber sulfur mass. The rubber sulfur mass may preferably contain 15 to 25 per cent. of sulfur. The plastic raw mass, after being thoroughly mixed, is cured at from 300 to 360 degrees F. for two or three hours. After being molded and cured, it may be soaked in a hot 10% potassium or sodium hydrate solution to further purify it from traces of sulfurous products which would contaminate the electrolyte. Insulators thus made are mechanically strong, resist abrasion, and the electrolytes are not contaminated therewith. Also, they can have a high degree of flexibility and toughness when desired.

It should be understood that my improved process is not strictly limited to the exact steps and proportions of ingredients described, the process specifically described being that which is preferable to obtain the best results. It is obvious that good results may be obtained, even though certain of the purifying processes are omitted, and that my invention is as broad as is indicated by the appended claims.

Having now described my invention, what I claim and desire to protect by Letters Patent is as follows:—

1. The process of forming an electrical insulating material which consists in removing water and uncombined phenol from a fusible phenol resin in which all the methylene-containing element is combined with phenol, dissolving hexa-methylene-tetra-amin in the mass which is maintained in molten condition, causing a hardening reaction to ensue with evolution of ammonia gas, cooling and pulverizing, further heating to from 420 to 500 degrees F., treating with a boiling caustic solution, washing, drying, incorporating with caoutchouc and a vulcanizing agent, vulcanizing and soaking in a hot caustic solution, substantially as described.

2. The process of forming an electrical insulating material, which consists in forming an infusible phenolic condensation product free from uncombined phenol, pulverizing the same, treating with a hot caustic solution, washing free of the caustic, incorporating with an elastic gum and a vulcanizing agent, vulcanizing; and further treating to remove traces of the vulcanizing agent and products thereof uncombined with the gum and condensation product, substantially as described.

3. An insulating compound which is resistant to strong caustic alkaline solutions, comprising an infusible hard phenolic condensation product in granular form, substantially free from phenol, water, ammonia, gaseous products, and other impurities, and incorporated in, and bound together in a tough cohesive mass by, purified vulcanized rubber, substantially as described.

This specification signed and witnessed this 1st day of November 1910.

JONAS W. AYLSWORTH.

Witnesses:
 DYER SMITH,
 ANNA R. KLEHM.

It is hereby certified that in Letters Patent No. 1,092,511, granted April 7, 1914, upon the application of Jonas W. Aylsworth, of East Orange, New Jersey, for an improvement in "Electrical-Insulation Composition and Methods of Preparing the Same," an error appears in the printed specification requiring correction as follows: Page 2, line 75, for the number "420" read *400;* and that the said Letters Patent should be read with this correction therein that the same may conform to the record of the case in the Patent Office.

Signed and sealed this 12th day of May, A. D., 1914.

[SEAL.]

J. T. NEWTON,

*Acting Commissioner of Patents.*